US008327542B2

(12) United States Patent
Tisch et al.

(10) Patent No.: US 8,327,542 B2
(45) Date of Patent: Dec. 11, 2012

(54) METHOD FOR THE PRODUCTION OF A DROP-FORGED BALANCING SHAFT

(75) Inventors: Siegfried Tisch, Gerlingen (DE); Klaus Weigand, Nuertingen (DE)

(73) Assignee: Schaeffler KG, Herzogenaurach (DE)

( * ) Notice: Subject to any disclaimer, the term of this patent is extended or adjusted under 35 U.S.C. 154(b) by 535 days.

(21) Appl. No.: 12/596,760

(22) PCT Filed: Mar. 19, 2008

(86) PCT No.: PCT/EP2008/053278
§ 371 (c)(1),
(2), (4) Date: Oct. 20, 2009

(87) PCT Pub. No.: WO2008/128834
PCT Pub. Date: Oct. 30, 2008

(65) Prior Publication Data

US 2010/0126457 A1 May 27, 2010

(30) Foreign Application Priority Data

Apr. 21, 2007 (DE) ........................ 10 2007 019 008

(51) Int. Cl.
*B21K 1/06* (2006.01)
*F02B 75/06* (2006.01)

(52) U.S. Cl. ................. 29/893.34; 29/888.01; 29/893.3; 123/192.2

(58) Field of Classification Search ............... 29/888.01, 29/888.08, 893, 893.33, 893.34, 6.01; 74/603; 123/192.2, 197.4
See application file for complete search history.

(56) References Cited

U.S. PATENT DOCUMENTS 1,486,587 A * 3/1924 Keeports ........................ 29/6.01
2,403,049 A * 7/1946 Carstens .................... 29/888.08
3,129,488 A * 4/1964 Robra et al. .............. 29/888.08
3,908,434 A * 9/1975 Ribback .......................... 72/400
4,094,048 A * 6/1978 Broder ....................... 29/888.08
4,811,585 A * 3/1989 Takahashi et al. .............. 72/108
4,982,589 A * 1/1991 Nomura ............................ 72/67
6,237,442 B1 * 5/2001 Killion ............................ 74/603
6,450,890 B1 9/2002 Hendrian et al.
7,533,646 B2 * 5/2009 Harms et al. ............... 123/192.2

FOREIGN PATENT DOCUMENTS

DE 44 12 476 A 10/1995
DE 101 15 536 A 10/2001
DE 103 47 348 A 5/2005
DE 10 2004 058 620 A 6/2006
GB 2 051 634 A 1/1981
WO 2004/099648 A 11/2004

* cited by examiner

*Primary Examiner* — Alexander P Taousakis
(74) *Attorney, Agent, or Firm* — Fitzpatrick, Cella, Harper & Scinto

(57) ABSTRACT

The invention relates to a method for the production of a drop-forged balancing shaft for a mass balancing gear of an internal combustion engine. The balancing shaft has an unbalanced plane formed by the rotational axis thereof and an eccentric mass center of gravity, and at least one bearing journal, the outer lateral surface of which serves as a track for a rolling bearing supporting the balancing shaft in the internal combustion engine. To this end, the balancing shaft is to be forged in a forging die having a parting plane extending in the direction of the rotational axis and rotated in relation to the unbalanced plane.

3 Claims, 1 Drawing Sheet

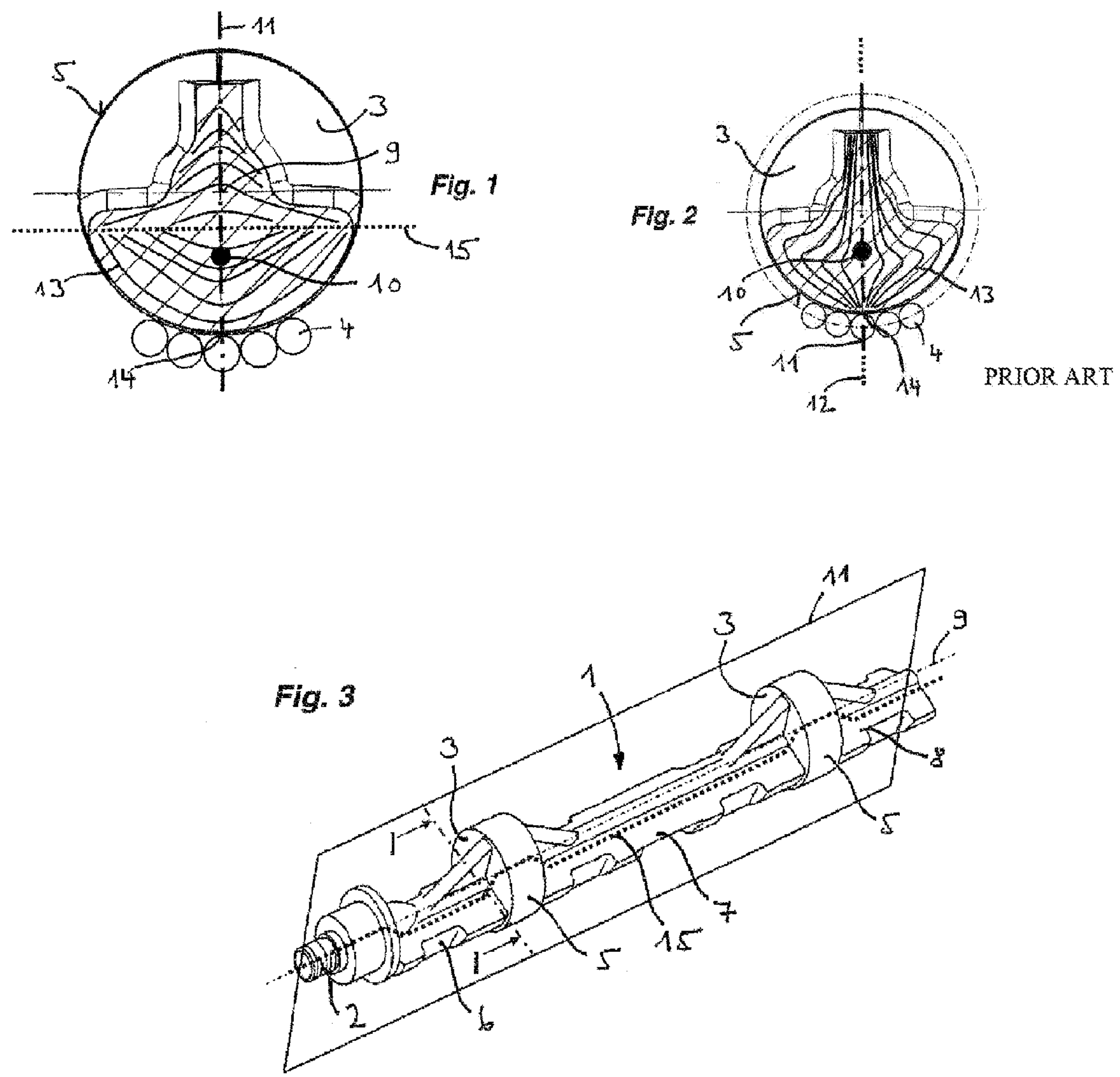
Fig. 1
Fig. 2
PRIOR ART
Fig. 3

METHOD FOR THE PRODUCTION OF A DROP-FORGED BALANCING SHAFT

This application is a 371 of PCT/EP2008/053278 filed Mar. 19, 2008, which in turn claims the priority of DE 10 2007 019 008.7 filed Apr. 21, 2007, the priority of both applications is hereby claimed and both applications are incorporated by reference herein.

FIELD OF THE INVENTION

The invention relates to a process for producing a drop-forged balancing shaft for a mass-balancing gear mechanism of an internal combustion engine. The balancing shaft comprises an unbalance plane defined by the axis of rotation of the balancing shaft and by an eccentric mass center of gravity, and at least one bearing journal, the outer lateral surface of which serves as a raceway for a rolling bearing which supports the balancing shaft in the internal combustion engine.

BACKGROUND OF THE INVENTION

The balancing shafts which are known to be used in internal combustion engines to partially or completely compensate for free inertial forces and/or moments of inertia are usually produced from cast or forged blanks. Known ways of supporting the balancing shaft in the internal combustion engine include not only sliding support but also rolling support or combined sliding/rolling support, in which case the raceway for the rolling bodies is formed either by an inner ring of the rolling bearing mounted on the bearing journal or, as is provided in the case of the present invention, directly by the outer lateral surface of the bearing journal.

However, the supporting method mentioned last may be disadvantageous in the case of a drop-forged balancing shaft because that point of the bearing journal which is subjected to the greatest loading and over which rolling bodies permanently roll is situated in the unbalance plane on the mass center of gravity side and the unbalance plane, as has been customary to date, coincides with the parting plane of the forging die. Although a parting plane of this type offers considerable advantages not only in terms of the then comparatively small outlay for producing the die halves but also in terms of the tool forces to be supported during the forging process owing to the fact that the balancing shaft is substantially symmetrical with respect to its unbalance plane, it is possible that the material fibers of the balancing shaft will flow together at that point of the bearing journal which is subjected to the greatest loading, and this is not suitable in terms of stress. Because the fibers are interrupted by the parting plane and are not homogeneously joined at that point, impurities included in the material may be transported onto the surface of the bearing journal as the balancing shaft is being forged and material simultaneously flows from the inside outward in the region of the loading zone. These impurities may then represent the starting point for premature fatigue damage on that spot of the raceway for the rolling bearing, which is subjected to the greatest loading.

OBJECT OF THE INVENTION

Therefore, the present invention is based on the object of developing the process for forging a balancing shaft of the type mentioned initially such that the above-mentioned disadvantage is overcome using simple means. As a result, already the forged blank should accordingly form the material basis for the operational reliability of the balancing shaft which satisfies the required service life of the internal combustion engine.

SUMMARY OF THE INVENTION

According to the invention, this object is achieved by means of the features of the characterizing part of claim 1; advantageous developments and refinements of the invention can be gathered from the dependent claims. It is accordingly provided that the balancing shaft is forged in a forging die having a parting plane which extends in the direction of the axis of rotation and is rotated in relation to the unbalance plane. As is also illustrated with reference to an exemplary embodiment of the invention explained below, the rotation of the parting plane according to the invention results in a material microstructure of the bearing journal which, in the region of the unbalance plane which is subjected to high loading, has a fiber flow that is suitable in terms of stress, i.e. an uninterrupted and homogeneous fiber flow, and this favors an at least largely impurity-free raceway with a long service life for the rolling bearing which supports the balancing shaft.

In a preferred development of the invention, it is provided that the parting plane extends substantially orthogonally with respect to the unbalance plane. In addition to an advantageously symmetrical force loading of the die halves, this orientation of the parting plane primarily has the effect that the inhomogeneous fiber flow extends symmetrically on both sides of the unbalance plane. In the region of the raceway, this leads to the largest possible circumferential angles on both sides of the unbalance plane on the bearing journal with a homogeneous fiber flow. However, the term "substantially orthogonally" is also understood to mean angles between the unbalance plane and the parting plane which differ from 90° by a value which surpasses the fluctuation range of customary general tolerances, as long as the forging process establishes a fiber flow of the bearing journal in the region of the unbalance plane which is sufficiently suitable in terms of stress within the meaning of the invention.

Finally, a parting plane which is cranked in the direction of the axis of rotation is provided, with the parting plane extending in a manner offset with respect to the axis of rotation of the balancing shaft in the direction of the mass center of gravity on at least a portion of said balancing shaft that is adjacent to the bearing journal. The cranked parting plane not only takes into account the characteristic geometry of the balancing shaft but also makes it possible to allow the weaker material microstructure in the region of the inhomogeneous fiber flow to follow the orientation of the so-called neutral axis (also referred to as the neutral line).

BRIEF DESCRIPTION OF THE DRAWINGS

Further features of the invention emerge from the description below and from the drawings which illustrate an exemplary embodiment of the invention. In the drawings:

FIG. 1 shows the cross section I-I of a balancing shaft according to FIG. 3, forged by the process according to the invention;

FIG. 2 shows the cross section I-I of a balancing shaft according to FIG. 3, forged by a known process; and FIG. 3 shows a perspective illustration of the balancing shaft known per se from the prior art.

DETAILED DESCRIPTION OF THE DRAWINGS

FIG. 3 shows an already finished balancing shaft 1, which is known per se to a person skilled in the art, for a mass-balancing gear mechanism (which is likewise known and not illustrated here) of an internal combustion engine. In this case, the mass-balancing gear mechanism serves to balance second-order inertial forces in a multicylinder in-line engine and comprises two of the illustrated balancing shafts 1 which rotate in opposite directions at twice the rotational speed of the crankshaft. The balancing shaft 1 is driven at a drive portion 2, for example by means of a chain wheel or a gear-wheel, and is supported radially on two bearing journals 3 in a casing of the internal combustion engine. Radial support is provided by means of two rolling bearings (likewise not illustrated in greater detail here, and the outer lateral surface of each of the bearing journals 3 serves as the inner raceway 5 for the rolling bodies 4 of these rolling bearings (see FIG. 1 or 2). The rolling bearings are preferably needle sleeves, which save radial installation space and are known to comprise a thin-walled outer ring formed in a non-cutting manner and a needle ring formed from the needles 4.

The balancing shaft 1 also has its function-related characteristic geometry with unbalance portions 6, 7 and 8 which extend adjacent to the bearing journals 3 and result in a mass center of gravity 10 which is eccentric in relation to the axis of rotation 9, as is shown in FIGS. 1 and 2. The axis of rotation 9 and the mass center of gravity 10 define an unbalance plane (designated by 11).

In the cross section I-I through the drop-forged balancing shaft 1 illustrated in FIG. 2, the unbalance plane 11, symbolized by the dash-dotted line, coincides with the parting plane 12 (illustrated by dots) of the forging die. In the case of this parting plane 12 which is customary in the prior art, use is made of the cross-sectional profile of the balancing shaft 1, which is substantially mirror-symmetrical with respect to the unbalance plane 11, in order to be able to use a forging die which is produces as simple as possible, with a generally planar parting plane 12 and symmetrical tool forces in the die halves. However, a considerable disadvantage of the parting plane 12 coinciding with the unbalance plane 11 relates to the material microstructure established in the process for forging the balancing shaft 1, this microstructure then having a fiber flow which is symbolized by the lines 13 and is interrupted both by the parting plane 12 and by the unbalance plane 11. Since the radial support of the balancing shaft 1 is known to involve a revolution ratio with a point load on the bearing journal 3 and a circumferential load on the bearing point of the casing in the internal combustion engine, a material microstructure of this type bears an increased risk that premature fatigue damage, such as the break-away of material, can arise on the raceway 5 for the rolling bearing at the point 14 of the bearing journal 3 which is subjected to the greatest loading.

As can be seen from the cross section I-I in FIG. 1, according to the invention, the balancing shaft 1 is to be forged with a parting plane 15 which is rotated in relation to the unbalance plane 11. In this preferred exemplary embodiment, the parting plane 15 is rotated by 90° in relation to the unbalance plane 11, and therefore, a material microstructure that is suitable in terms of stress with respect to the point load on the raceway 5 of the bearing journal 3 is established during the forging process. It can clearly be seen that in this manner, it is possible to achieve a homogenous and uninterrupted fiber flow 13 in the region of that point 14 of the bearing journal 3 that is subjected to the greatest loading.

Furthermore, it can be gathered from FIG. 1 that the parting plane 15 extends in a manner offset with respect to the axis of rotation 9 in the direction of the mass center of gravity 10 on the unbalance portion 6 adjacent to the bearing journal 3, according to the section I-I in FIG. 3. In order to be able to remove the balancing shaft 1 from the forging die, provision is made in this case of a parting plane 15 which is "cranked" repeatedly in the direction of the axis of rotation 9 for the forging die, as illustrated. Specifically, the "cranked" parting plane 15 of FIG. 3 is a fixed geometric property of the forging die, and does not result from the forging process itself. That is to say, the geometric property provides that the parting plane 15 is not planar but is stepped in the direction of the axis of rotation 9 as illustrated in FIG. 3. Cranking permits removing the forged shaft with the unbalance portions 7, 8 being less than a half circle in cross section from the lower die half. Moreover, the parting plane 15 illustrated schematically by the dotted line in FIG. 3, extends level with the axis of rotation 9 in the region of the drive portion 2 and of the bearing journals 3, and in the region of the unbalance portions 6, 7 and 8 extends in a manner offset toward the mass center of gravity 10.

LIST OF REFERENCE NUMERALS

1 Balancing shaft
2 Drive portion
3 Bearing journal
4 Rolling body
5 Raceway
6 Unbalance portion
7 Unbalance portion
8 Unbalance portion
9 Axis of rotation
10 Mass center of gravity
11 Unbalance plane
12 Known parting plane
13 Fiber flow
14 Point of the bearing journal subjected to the greatest loading
15 Parting plane according to the invention

The invention claimed is:

1. A process for producing a drop-forged balancing shaft for a mass-balancing gear mechanism of an internal combustion engine, the balancing shaft comprising an unbalance plane defined by an axis of rotation of the balancing shaft and by an eccentric mass center of gravity, and at least one bearing journal, an outer lateral surface of which serves as a raceway for a rolling bearing that supports the balancing shaft in the internal combustion engine, the process comprising:

drop-forging the balancing shaft in a forging die having a parting plane extending in a direction of the axis of rotation and at an angle that is offset from the unbalance plane.

2. The process of claim 1, wherein the parting plane extends substantially orthogonally with respect to the unbalance plane.

3. The process of claim 2, wherein the parting plane is cranked in the direction of the axis of rotation and extends in a manner offset with respect to the axis of rotation in the direction of the mass center of gravity on at least a portion of the balancing shaft that is adjacent to the bearing journal.

* * * * *